US009517602B2

(12) United States Patent
Tatemi et al.

(10) Patent No.: US 9,517,602 B2
(45) Date of Patent: Dec. 13, 2016

(54) UNLOADING DEVICE

(71) Applicant: MITSUBISHI HEAVY INDUSTRIES MACHINERY TECHNOLOGY CORPORATION, Hiroshima-shi, Hiroshima (JP)

(72) Inventors: Hiroki Tatemi, Hiroshima (JP); Keisuke Yusa, Hiroshima (JP)

(73) Assignee: MITSUBISHI HEAVY INDUSTRIES MACHINERY TECHNOLOGY CORPORATION, Hiroshima-shi, Hiroshima (JP)

( * ) Notice: Subject to any disclaimer, the term of this patent is extended or adjusted under 35 U.S.C. 154(b) by 0 days.

(21) Appl. No.: 14/771,407

(22) PCT Filed: Jan. 22, 2014

(86) PCT No.: PCT/JP2014/051246
§ 371 (c)(1),
(2) Date: Aug. 28, 2015

(87) PCT Pub. No.: WO2015/111150
PCT Pub. Date: Jul. 30, 2015

(65) Prior Publication Data
US 2016/0009037 A1    Jan. 14, 2016

(51) Int. Cl.
*B29D 30/06* (2006.01)
*B29D 30/00* (2006.01)
(Continued)

(52) U.S. Cl.
CPC ....... *B29D 30/0016* (2013.01); *B29C 37/0007* (2013.01); *B29D 30/0603* (2013.01);
(Continued)

(58) Field of Classification Search
CPC ................... B29D 30/0643; B29D 2030/0027; B29D 30/0603
(Continued)

(56) References Cited

U.S. PATENT DOCUMENTS 3,343,208 A * 9/1967 Pacciarini .......... B29D 30/0603
414/626
3,477,100 A * 11/1969 Pech .................. B29D 30/0603
425/34.1
(Continued)

FOREIGN PATENT DOCUMENTS

| CN | 101337409 B | 6/2010 |
| JP | S60-000906 A | 1/1985 |

(Continued)

OTHER PUBLICATIONS

Taiwan Patent Office, "Office Action for TW 103102484," Sep. 7, 2015.
(Continued)

*Primary Examiner* — James Mackey
(74) *Attorney, Agent, or Firm* — Manabu Kanesaka; Benjamin Hauptman; Kenneth Berner

(57) ABSTRACT

An unloading device includes a pair of support bodies which supports side surfaces of a vulcanized tire vulcanized by a tire vulcanizer from the lower portion in a vertical direction, and a movement portion which moves the support bodies. The movement portion includes a horizontal movement mechanism which moves the support bodies in a horizontal direction from a position at which the vulcanized tire can be extracted from the tire vulcanizer to a position at which the vulcanized tire can be held by a PCI device for cooling the vulcanized tire, and a transport mechanism which transports the vulcanized tire, which is received from the PCI device by the support bodies, to a carrying-out destination.

5 Claims, 12 Drawing Sheets

(51) Int. Cl.
*B29C 37/00* (2006.01)
*B65G 47/90* (2006.01)
*B29C 35/02* (2006.01)

(52) U.S. Cl.
CPC ............ *B65G 47/902* (2013.01); *B29C 35/02* (2013.01); *B29D 30/0643* (2013.01); *B29D 2030/0027* (2013.01)

(58) Field of Classification Search
USPC .................................................. 425/38, 58.1
See application file for complete search history.

(56) References Cited

U.S. PATENT DOCUMENTS

| | | | |
|---|---|---|---|
| 4,573,859 A | | 3/1986 | Amano et al. |
| 4,702,669 A | * | 10/1987 | Ichikawa ............ B29D 30/0603 198/468.6 |
| 4,834,636 A | * | 5/1989 | Ichikawa ............ B29D 30/0601 425/38 |
| 6,241,501 B1 | * | 6/2001 | Mitamura ........... B29D 30/0603 425/38 |
| 7,744,359 B2 | | 6/2010 | Himeno et al. |
| 8,366,426 B2 | * | 2/2013 | Singh ................ B29D 30/0643 425/38 |
| 8,950,250 B2 | * | 2/2015 | Wakazono ............. B65G 37/00 73/146 |
| 2011/0088812 A1 | | 4/2011 | Singh et al. |

FOREIGN PATENT DOCUMENTS

| | | |
|---|---|---|
| JP | H01-137208 U | 9/1989 |
| JP | H11-268039 A | 10/1999 |
| JP | 2000-158447 A | 6/2000 |
| JP | 2001-030256 A | 2/2001 |
| JP | 2004-50456 A | 2/2004 |
| JP | 2007-320151 A | 12/2007 |
| TW | 200616777 A | 6/2006 |
| TW | 201245682 A | 11/2012 |

OTHER PUBLICATIONS

Europe Patent Office, "Search Report for European Patent Application No. 14880079.0," Mar. 4, 2016.
PCT, "International Search Report for International Application No. PCT/JP2014/051246".
PCT, "Written Opinion of the International Searching Authority of PCT/JP2014/051246", PCT/ISA/237.
Japan Patent Office, "Office Action for Japanese Patent Application No. 2015-526423," Apr. 26, 2016.

* cited by examiner

UNLOADING DEVICE

RELATED APPLICATIONS

The present application is National Phase of International Application No. PCT/JP2014/051246 filed Jan. 22, 2014 the disclosure of which is hereby incorporated by reference herein in its entirety.

TECHNICAL FIELD

The present invention relates an unloading device.

BACKGROUND ART

A tire vulcanizer is known in which heat and pressure are applied to a raw rubber tire which is molded so as to be in a shape close to a finished product in advance in a mold, and the tire is vulcanized and is finished so as to be a completed tire.

In the tire vulcanizer, a post-cure inflator (PCI) device which receives the vulcanized tire from the inner portion of the mold or cools the vulcanized tire, or an unloading device which delivers the vulcanized tire to a carrying-out destination is provided. For example, as disclosed in PTL 1, in the unloading device, a turning arm is rotated in a state where the vulcanized tire is held, and the tire can be transported between the position of the mold, the position of the PCI device, and a position of a discharging conveyor. In addition, the vulcanized tire is discharged at the position of the discharging conveyor, and thus, the tire is transported to a carrying-out conveyor which is the transport destination.

CITATION LIST

Patent Literature

[PTL 1] Japanese Unexamined Patent Application Publication No. 11-268039

SUMMARY OF INVENTION

Technical Problem

However, in the unloading device described in PTL 1, since the vulcanized tire is transported to the carrying-out conveyor which is the transport destination, it is necessary to use a turning arm which moves in a complicated manner. Accordingly, the number of parts for installing the unloading device increases, and cost increases. In addition, since the discharging conveyor which transports the vulcanized tire transported by the turning arm to the carrying-out conveyor is also used, the number of parts further increases.

The present invention is to provide an unloading device capable of decreasing an installation cost.

Solution to Problem

In order to solve the above-described problems, the invention proposes the following means.

According to a first aspect of the invention, there is provided an unloading device which transports a vulcanized tire vulcanized by a tire vulcanizer from the tire vulcanizer to a cooling PCI device, and transports the vulcanized tire cooled by the PCI device, including: a pair of support bodies which is formed to extend in a horizontal direction and supports side surfaces of the vulcanized tire from the lower portion in a vertical direction; and a movement portion which moves the support bodies, in which the movement portion includes: a horizontal movement mechanism which moves the support bodies in the horizontal direction from a tire extraction position at which the vulcanized tire supported by a bead ring of the tire vulcanizer can be extracted to a PCI tire holding position at which the vulcanized tire can be held by a tire holding portion of the PCI device; and a transport mechanism which transports the vulcanized tire, which is cooled by the PCI device and is received by the pair of support bodies at the PCI tire holding position, to a carrying-out destination.

According to the unloading device, since the support bodies are moved by the horizontal movement mechanism, it is possible to easily transport the vulcanized tire from the tire vulcanizer to the PCI device, and it is possible to easily move the vulcanized tire from the PCI device to the carrying-out destination by the transport mechanism. Accordingly, with a simple configuration which includes the support bodies which support the vulcanized tire from the lower portion in the vertical direction, and the horizontal movement mechanism which moves the support bodies in the horizontal direction, and the transport mechanism, it is possible to transport the vulcanized tire from the tire vulcanizer. Therefore, it is possible to install the unloading device with the small number of parts without having a complicated configuration.

In the unloading device according to a second aspect of the invention, the movement portion may include a vertical movement mechanism which moves the support bodies upward and downward in the vertical direction, and the vertical movement mechanism may move the support bodies upward in the vertical direction with respect to the bead ring supporting the vulcanized tire, and receive the vulcanized tire from the bead ring.

According to the unloading device, since the vertical movement mechanism is provided, it is possible to easily detach the vulcanized tire supported by the bead ring of the tire vulcanizer. That is, by only moving the support bodies upward with respect to the vulcanized tire supported by the bead ring so that the support bodies are directed from the lower portion to the upper portion in the vertical direction, it is possible to easily detach the vulcanized tire from the bead ring. Accordingly, it is possible to provide a mechanism which easily detaches the vulcanized tire from the tire vulcanizer with a simple configuration. Therefore, it is possible to install the unloading device with the small number of parts, and it is possible to further decrease the installation cost.

In the unloading device according to a third aspect of the invention, the support body may include a plurality of rollers, and the transport mechanism may include a rotation mechanism which rotates the pair of support bodies so that the side of the transport mechanism opposite to the carrying-out destination is directed upward.

According to the unloading device, the support bodies are inclined by the rotation mechanism, and thus, it is possible to smoothly move the vulcanized tire onto the rollers attached to the support bodies. Accordingly, it is possible to provide a mechanism which transports the vulcanized tire to the carrying-out destination with a simple configuration. Therefore, it is possible to install the unloading device with the smaller number of parts, and it is possible to further decrease the installation cost.

In the unloading device according to a fourth aspect of the invention, the support body may include a plurality of rollers, the transport mechanism may include a rotation mechanism which rotates the pair of support bodies so that the side of the transport mechanism opposite to the carrying-out destination is directed upward, and the rotation mechanism may rotate the pair of support bodies when the pair of support bodies is moved from the PCI tire holding position by the vertical movement mechanism.

According to the unloading device, it is possible to configure a mechanism which moves the vulcanized tire cooled by the PCI device to the carrying-out destination using the vertical movement mechanism, and it is possible to make the unloading device compact. Accordingly, it is possible to secure a space around the unloading device, and it is possible to secure a wider work space around the tire vulcanizer or the PCI device.

In the unloading device according to a fifth aspect of the invention, the rotation mechanism may include a base portion which includes an inclined surface and a contacted body which can come into contact with the inclined surface, and the contacted body may come into contact with and be pressed by the inclined surface to rotate the pair of support bodies.

According to the unloading device, it is possible to easily form a configuration which rotates the support body.

The unloading device according to a sixth aspect of the invention, may further include: a plane position adjusting portion which positions a plane position of the vulcanized tire on the pair of the support bodies at the PCI tire holding position.

According to the unloading device, since the support bodies move from the tire extraction position to the PCI tire holding position by the horizontal movement mechanism, even when the position of the vulcanized tire on the support bodies is deviated, it is possible to adjust the position of the vulcanized tire to a position at which the vulcanized tire can be delivered to the PCI device with high accuracy and to move the vulcanized tire. Accordingly, it is possible to stably transport the vulcanized tire on the support bodies moved by the horizontal movement mechanism to the PCI device.

Advantageous Effects of Invention

According to the unloading device, since the unloading device can be installed with the small number of parts, it is possible to decrease the installation cost.

DESCRIPTION OF EMBODIMENTS

Hereinafter, an embodiment of the present invention will be described with reference to FIGS. 1 to 12.

Figure 1:
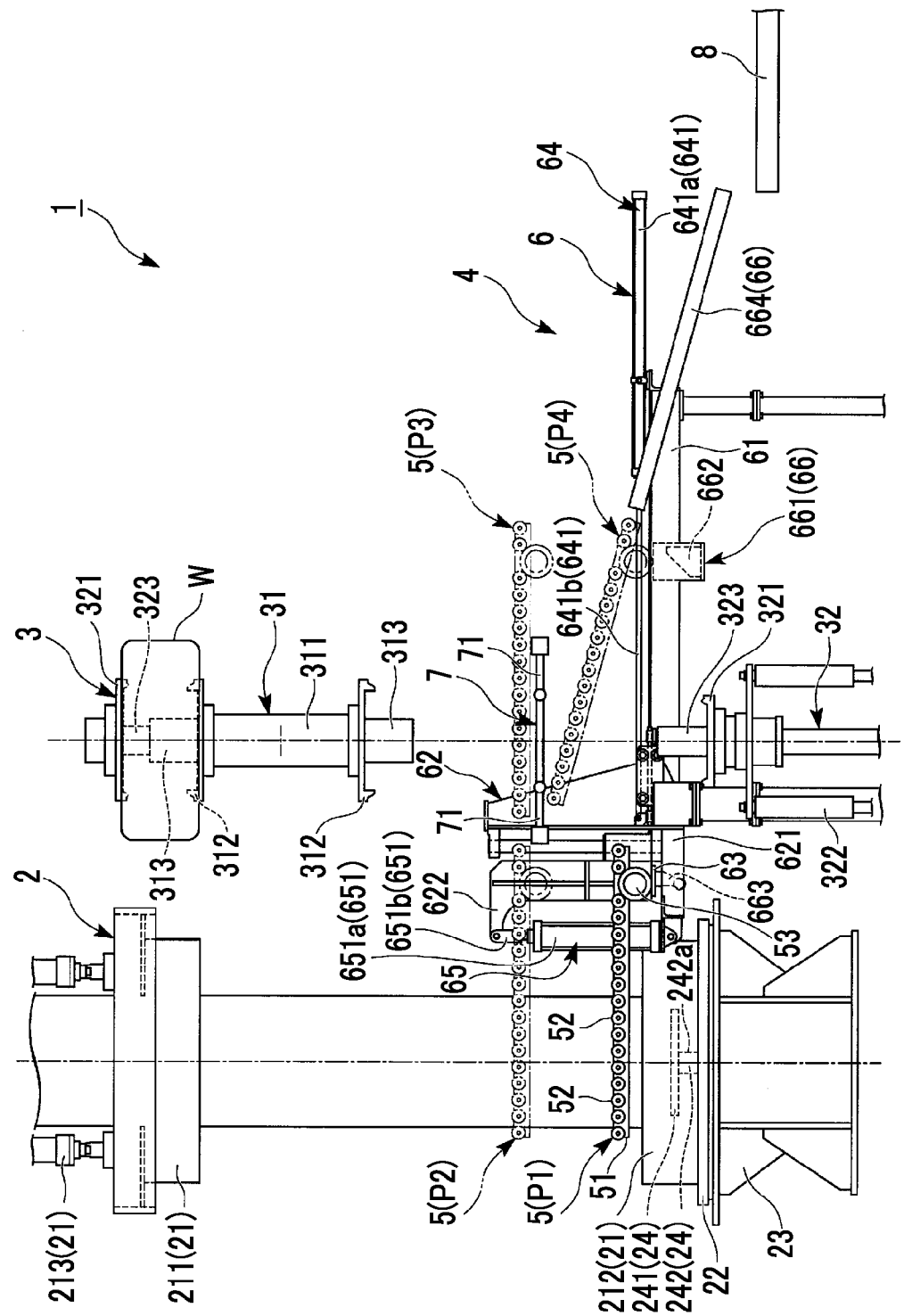
FIG. 1 is a side view showing a tire vulcanizing system in an embodiment of the present invention.
Figure 2:
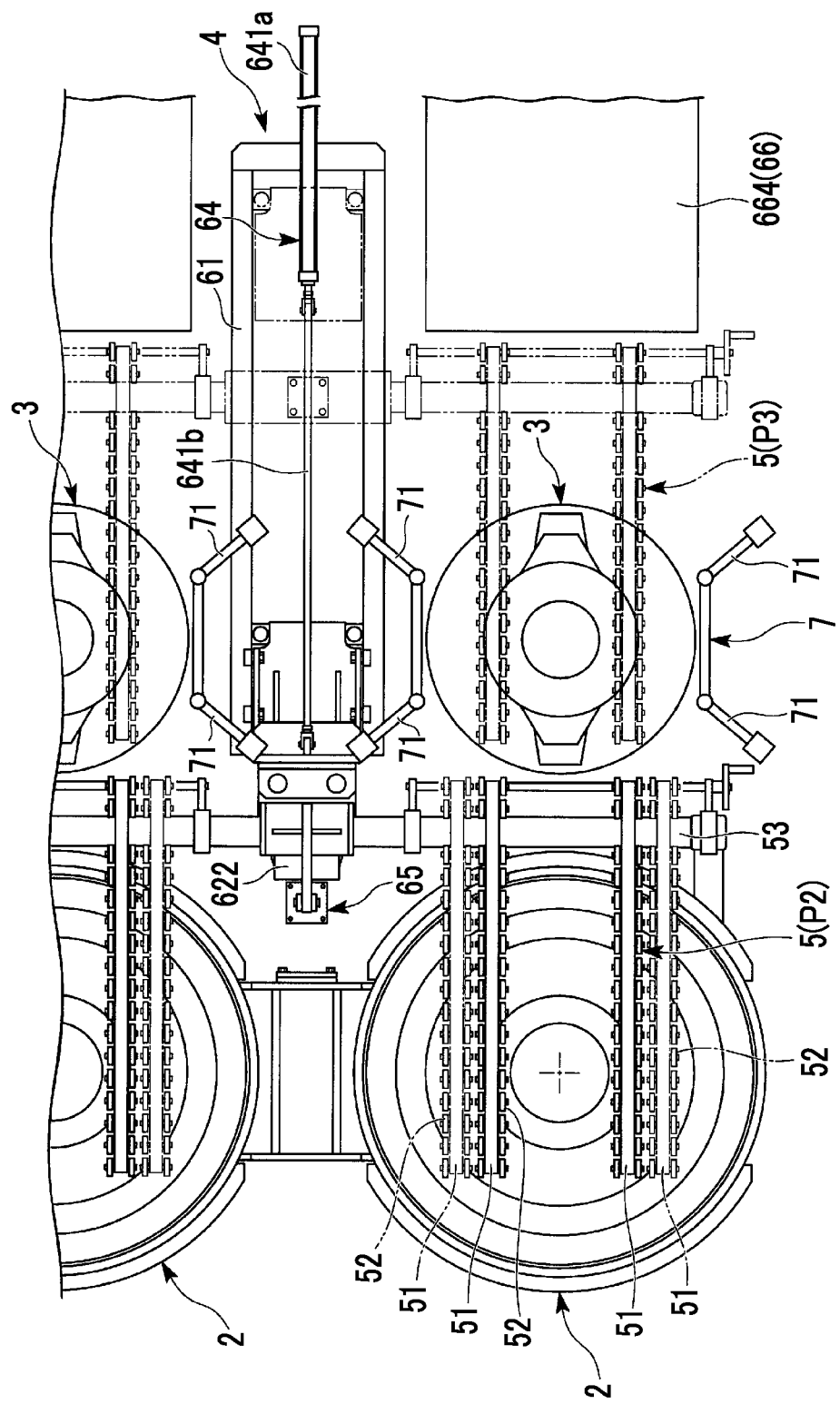
FIG. 2 is a top view showing a portion of the tire vulcanizing system in the embodiment of the present invention.

As shown in FIGS. 1 and 2, a tire vulcanizing system 1 of the present embodiment carries-in an unvulcanized green tire before vulcanization is performed from a front side (the left side on a paper surface of FIG. 1) which is the side into which the green tire is carried and performs vulcanization by a tire vulcanizer 2 to make a vulcanized tire W. In addition, the tire vulcanizing system 1 cools the vulcanized tire W through a cooling post-cure inflator (PCI) device, and carries-out the vulcanized tire toward a rear side (the right side on the paper surface of FIG. 1) which is a carrying-out destination 8 side.

That is, the tire vulcanizing system 1 of the present embodiment includes a tire vulcanizer 2 which performs the vulcanization on the green tire, a PCI device 3 which cools the vulcanized tire W vulcanized by the tire vulcanizer 2, and an unloading device 4 which transports the vulcanized tire W.

Here, in the present embodiment, the tire vulcanizing system 1 includes the tire vulcanizers 2, the PCI devices 3, and the unloading devices 4 so as to be symmetrical in a width direction (the inner direction on the paper surface of FIG. 1 and up-down direction on the paper surface of FIG. 2) orthogonal to a horizontal direction (right-left direction on the paper surface of FIG. 1), and processes the vulcanized tire W symmetrically and bilaterally.

The tire vulcanizer 2 performs the vulcanization which generates a chemical reaction by applying heat and pressure to the unvulcanized green tire. The tire vulcanizer 2 includes a mold 21 which is formed so as to be divided into an upper mold 211 and a lower mold 212 to vulcanize and mold the green tire. The tire vulcanizer 2 includes a bead lift portion 24 which supports the vulcanized tire W so as to be moved in a vertical direction (up-down direction on the paper surface of FIG. 1).

The upper mold 211 is supported by an upper mold lifting device 213, and can approach or be separated from the lower mold 212 in the vertical direction.

The lower mold 212 is fixed to a pedestal 23 which supports the mold 21 via a lower platen 22 from the lower portion.

The lower platen 22 is a heating plate which can be heated by a heat source (not shown), and can support and heat the lower mold 212 from the lower portion.

The bead lift portion 24 includes a bead ring 241 which supports the green tire or the vulcanized tire W, and a bead lift portion main body 242 which moves the bead ring 241 upward and downward in the vertical direction.

The bead ring 241 holds and supports a lower side bead portion of the green tire or the vulcanized tire W.

The bead lift portion main body 242 moves the bead ring 241 upward in the vertical direction, and thus, the vulcanized tire W is separated from the lower mold 212. The bead lift portion main body 242 includes an inner tube 242a which is formed in a cylindrical shape in the vertical direction, and a cylinder (not shown) which moves the inner tube 242a upward and downward in the vertical direction. The bead ring 241 is attached to the inner tube 242a of the bead lift portion main body 242 along the outer circumference of the upper end of the inner tube 242a. In the bead lift portion main body 242, the inner tube 242a is moved upward and downward in the vertical direction by driving the cylinder (not shown), and thus, the bead ring 241 can move upward and downward with respect to the lower mold 212.

The PCI device 3 is disposed behind the tire vulcanizer 2 in the horizontal direction, and cools the vulcanized tire W with the tire vulcanizer 2. The PCI device 3 includes an upper tire holding portion 31 which extends in the vertical direction and is provided symmetrically and vertically, and a lower tire holding portion 32 which is disposed so as to oppose the upper tire holding portion 31 below the upper tire holding portion 31.

The upper tire holding portion 31 is a tire holding portion of the PCI device 3. The upper tire holding portion 31 includes an upper tire holding portion main body 311 which can rotate about a support frame (not shown), and upper rims 312 which are provided on upper and lower end portions of the upper tire holding portion main body 311. The upper rim 312 has an upper rim side connection device 313, which is connected to and separated from the lower tire holding portion 32, as a center axis. The upper tire holding portion 31 rotates the upper tire holding portion main body 311 so as to be inverted vertically about the support frame (not shown), and after the vulcanized tire W is received from the lower tire holding portion 32, compressed air is introduced into the inner portion of the vulcanized tire W and the vulcanized tire W is cooled.

The lower tire holding portion 32 is also the tire holding portion of the PCI device 3. The lower tire holding portion 32 includes a lower rim 321 which receives and fixes the vulcanized tire W, and a lower rim lifting device 322 which lifts and lowers the lower rim 321 in the vertical direction. The lower tire holding portion 32 has a lower rim side connection device 323, which is connected to and separated from the upper rim side connection device 313, as a center axis. Moreover, when the lower rim 321 is connected to the upper rim side connection device 313 by the lower rim side connection device 323, the lower rim lifting device 322 separates the lower rim 321.

The unloading device 4 transports the vulcanized tire W to the PCI device 3 which cools the vulcanized tire W vulcanized by the tire vulcanizer 2, and carries-out the vulcanized tire W cooled by the PCI device 3 to the carrying-out destination 8. The unloading device 4 of the present embodiment includes a pair of support bodies 5 which supports the side surface of the vulcanized tire W, a movement portion 6 which moves the support bodies 5 from the tire vulcanizer 2 to the carrying-out destination 8 via the PCI device 3, and a plane position adjusting portion 7 which positions a plane position of the vulcanized tire W on the support bodies 5 with respect to the PCI device 3.

In addition, although the carrying-out destination 8 in the present embodiment is not shown in detail, the carrying-out destination 8 is disposed behind the PCI device 3 in the horizontal direction, and is a main conveyor which transports the cooled vulcanized tire W to the next step.

The pair of support bodies 5 is disposed so as to be separated from each other in the width direction while interposing the center axis of the vulcanized tire W to support the side surface of the vulcanized tire W from the lower portion. The pair of support bodies 5 is disposed so as to be separated from each other in the width direction so that the bead lift portion 24 of the tire vulcanizer 2 or the lower tire holding portion 32 of the PCI device 3 can be inserted into the portion between the pair of the support bodies 5. As shown in FIG. 2, the support bodies 5 of the present embodiment are formed symmetrically and bilaterally in the width direction. Each of the pair of support bodies 5 includes a support body main unit 51 which extends in the horizontal direction, a plurality of rollers 52 which can be rotated with the support body main unit 51 and are disposed so as to be arranged in the horizontal direction, and a support body rotating shaft 53 which supports the support body main unit 51 at the rear side in the horizontal direction. In the support body 5 of the present embodiment, since the support body main unit 51 on which the plurality of rollers 52 are disposed is supported by the support body rotating shaft 53, a roller conveyor which is divided in the width direction is configured.

The support body main unit 51 is formed so as to extend in a rectangular shape in the horizontal direction.

The plurality of rollers 52 are arranged in the horizontal direction in the state where the support body main unit 51 is interposed in the width direction, and are rotatably attached around rotating shafts extending in the width direction. The rollers 52 are disposed to partially protrude from the upper surface of the support body main unit 51, and thus, the vulcanized tire W disposed on the support body main unit 51 can move along the direction in which the support body main unit 51 extends.

The support body rotating shaft 53 is formed so as to extend in a columnar shape in the width direction. The support body rotating shaft 53 is connected to the support body main unit 51 so as to support the support body main unit 51 in a state where the rear side in the horizontal direction of the support body main unit 51 is supported in a cantilevered manner. The support body rotating shaft 53 of the present embodiment supports the plurality of support body main units 51. When the support body main unit 51 is in a horizontal state, since the support body main unit 51 abuts a stopper (not shown), the support body main body 51 is regulated from being rotated in the direction in which the front side or the lower side of the support body main unit 51 is positioned with respect to the support body rotating shaft 53.

The movement portion 6 moves the support body 5 with respect to the tire vulcanizer 2 or the PCI device 3, and transports the vulcanized tire W. As the positions of the support body 5 which is moved by the movement portion 6 of the present embodiment, there is a support body insertion position P1 at which the support body 5 is inserted into the lower portion of the vulcanized tire W separated from the lower mold 212 of the tire vulcanizer 2, a tire extraction position P2 at which the vulcanized tire W is extracted at the upper portion in the vertical direction of the support body insertion position P1, a PCI tire holding position P3 at which the vulcanized tire W is horizontally moved to the rear side in the horizontal direction with respect to the tire extraction position P2 and is delivered to the lower tire holding portion 32 of the PCI device 3, and a tire discharging position P4 which is positioned below the PCI tire holding position P3 in the vertical direction and at which the vulcanized tire W received from the PCI device 3 is carried-out to the carrying-out destination 8.

The support body insertion position P1 is a position below the vulcanized tire W which is moved so as to be lifted upward in the vertical direction from the lower mold 212 by the bead lift portion main body 242. The support body insertion position P1 of the present embodiment is a position between the lifted vulcanized tire W and the lower mold 212, and a position at which the inner tube 242a of the lifted bead lift portion main body 242 is disposed between the pair of support bodies 5 in the width direction. In the support body insertion position P1, preferably, an axis along which the center axis of the inner tube 242a of the bead lift portion main body 242 is extended and the center axis of the vulcanized tire W horizontally supported on the support body main unit 51 overlap with each other. In the support body insertion position P1, the support body main unit 51 is disposed in a state of extending in the horizontal direction.

The tire extraction position P2 is positioned above the support body insertion position P1 in the vertical direction, and is the position at which the vulcanized tire W held by the bead ring 241 of the tire vulcanizer 2 is detached from the bead ring 241. That is, the tire extraction position P2 is the position at which the vulcanized tire W is extracted from the tire vulcanizer 2. The tire extraction position P2 of the present embodiment is a position which is moved in parallel upward in the vertical direction from the support body insertion position P1, and is positioned above the position of the bead ring 241 of the lifted bead lift portion main body 242. In the tire extraction position P2, the support body main unit 51 is disposed in the state of extending in the horizontal direction.

The PCI tire holding position P3 is positioned behind the tire extraction position P2 in the horizontal direction, and is a position at which the vulcanized tire W is held by the lower tire holding portion 32 of the PCI device 3 or a position at which the vulcanized tire W is detached from the lower tire holding portion 32. That is, the PCI tire holding position P3 is a position at which the vulcanized tire W transported from the tire vulcanizer 2 is delivered from the support body 5 to the PCI device 3, and a position at which the support body 5 receives the cooled vulcanized tire W from the PCI device 3. The PCI tire holding position P3 of the present embodiment is a position which is moved in parallel rearward in the horizontal direction from the tire extraction position P2, and a position at which the lower rim 321 lifted by the lower rim lifting device 322 is disposed between the pair of support bodies 5 in the width direction. In the PCI tire holding position P3, preferably, the center axis of the lower rim 321 lifted by the lower rim lifting device 322 and the center axis of the vulcanized tire W horizontally supported on the support body main unit 51 overlap with each other. In the PCI tire holding position P3, the support body main unit 51 is disposed in a state of extending in the horizontal direction.

The tire discharging position P4 is positioned below the PCI tire holding position P3 in the vertical direction, and is a position at which the support body 5 is inclined and the vulcanized tire W is transported to the carrying-out destination 8. In the tire discharging position P4 of the present embodiment, the rear end portion in the horizontal direction of the support body main unit 51 connected to the support body rotating shaft 53 is moved in parallel rearward in the horizontal direction from the support body insertion position P1. In the tire discharging position P4, the support body main unit 51 is disposed in a state where the front end portion of the support body main unit 51 in the horizontal direction is inclined upward. The tire discharging position P4 is an initial position at which the support body 5 waits when the support body 5 is not moved by the unloading device 4 or the like.

Figure 3:
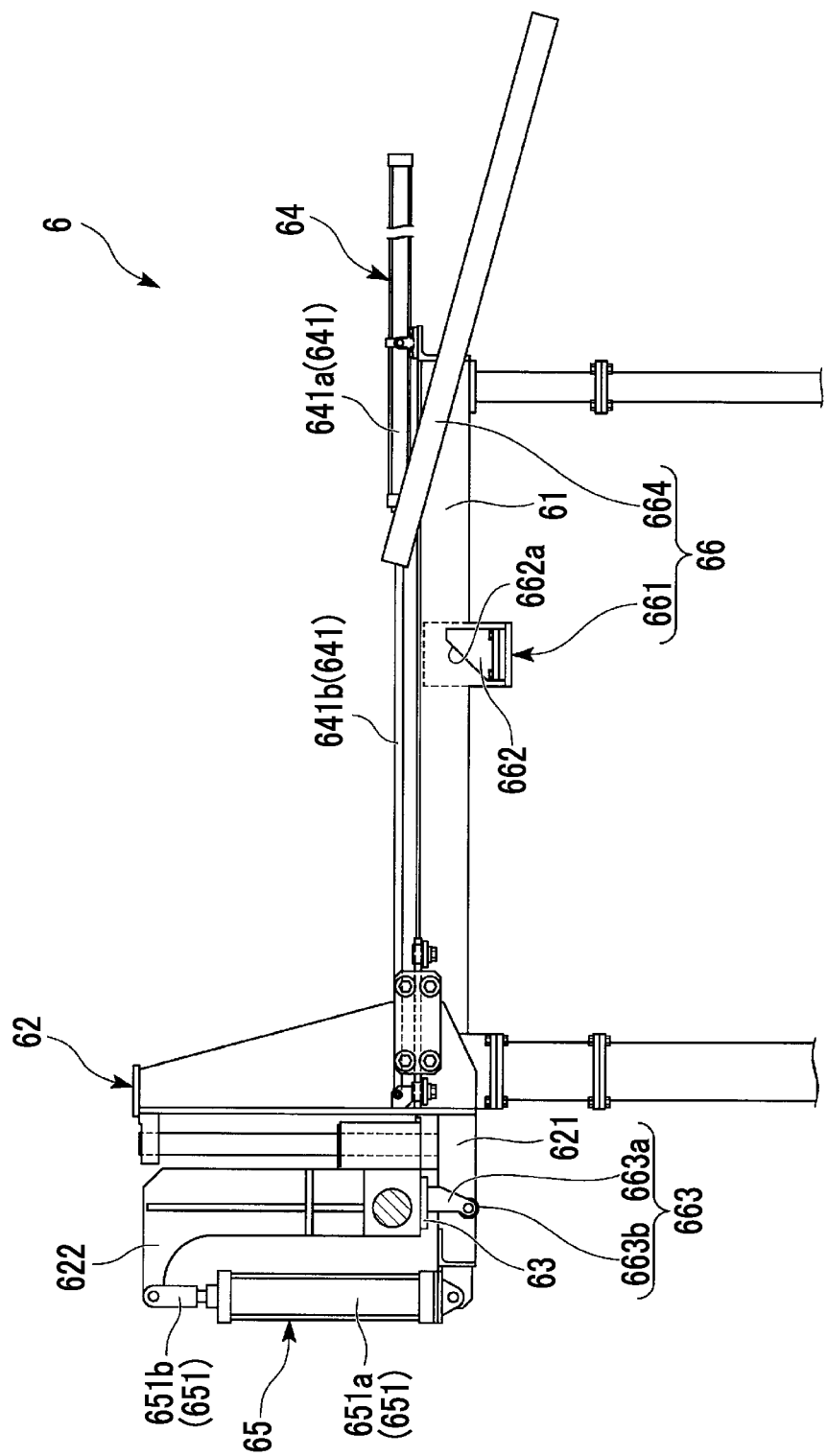
FIG. 3 is a side view showing a movement portion of an unloading device according to the embodiment of the present invention.

As shown in FIG. 3, the movement portion 6 of the present embodiment includes a base 61, an exterior portion 62 which is movably attached to the base 61, a moving body main unit 63 which is connected to the support body rotating shaft 53 and is rotatably attached in the exterior portion 62, a horizontal movement mechanism 64 which horizontally moves the support body 5 via the exterior portion 62, a vertical movement mechanism 65 which vertically moves the support body 5 via the exterior portion 62, and a transport mechanism 66 which transports the vulcanized tire W cooled by the PCI device 3 to the carrying-out destination 8.

The base 61 is fixed to the tire vulcanizer 2 or the PCI device 3 so as not to move relative to each other.

The exterior portion 62 is provided on the base 61, and is attached to the base 61 so as to be movable in the horizontal direction and the vertical direction. The exterior portion 62 of the present embodiment includes a first exterior portion 621 which moves in the horizontal direction with respect to the base 61, and a second exterior portion 622 which is movably attached to the first exterior portion 621 in the vertical direction.

The moving body main unit 63 is rotatably attached around a shaft extending in the width direction with respect to the second exterior portion 622 in the second exterior portion 622. The moving body main unit 63 is connected to the support body rotating shaft 53 of the support body 5, and the support body rotating shaft 53 is rotated according to the rotation of the moving body main unit 63.

The horizontal movement mechanism 64 moves the support body 5 in the horizontal direction between the vulcanizer 2 and the PCI device 3. Specifically, the horizontal movement mechanism 64 horizontally moves the support body 5 toward the rear side in the horizontal direction from the tire extraction position P2 to the PCI tire holding position P3. In addition, the horizontal movement mechanism 64 horizontally moves the support body 5 forward in the horizontal direction from the tire discharging position P4 to the support body insertion position P1. The horizontal movement mechanism 64 of the present embodiment horizontally moves the first exterior portion 621 with respect to the base 61, moves the support body rotating shaft 53 connected to the moving body main unit 63, and moves the support body main unit 51. More specifically, as a driving mechanism, the horizontal movement mechanism 64 includes a first air cylinder 641 which is disposed so as to extend in the horizontal direction.

The first air cylinder 641 moves the first exterior portion 621 forward or rearward in the horizontal direction. The first air cylinder 641 includes a first air cylinder main body 641a, and a first rod 641b which can be extended and contracted in the horizontal direction with respect to the first air cylinder main body 641a. In the first air cylinder 641, the first air cylinder main body 641a is attached onto the base 61, and the front end portion in the horizontal direction of the first rod 641b is attached to the first exterior portion 621.

Moreover, for example, as the first air cylinder 641, a hydraulic pressure cylinder or the like is used, and the first exterior portion 621 can be moved straight in the horizontal direction with respect to the base 61 by the extension and contraction of the first rod 641*b*. Here, specifications of the first air cylinder 641 are determined so that, in a state where the first rod 641*b* is accommodated in the first air cylinder main body 641*a* in the shortest length thereof, the position in the horizontal direction of the support body main unit 51 is set to the PCI tire holding position P3, and in a state where the first rod 641*b* protrudes from the first air cylinder main body 641*a* in the longest length thereof, the position in the horizontal direction of the support body main unit 51 is set to the tire extraction position P2.

The vertical movement mechanism 65 moves the support body 5 upward and downward in the vertical direction with respect to the tire vulcanizer 2 or the PCI device 3. Specifically, the vertical movement mechanism 65 moves the support body 5 upward in the vertical direction from the support body insertion position P1 to the tire extraction position P2. In addition, the vertical movement mechanism moves the support body 5 downward in the vertical direction from the PCI tire holding position P3 to the tire discharge position P4. That is, since the vertical movement mechanism 65 of the present embodiment moves the second exterior portion 622 in the vertical direction with respect to the first exterior portion 621, the support body rotating shaft 53 connected to the moving body main unit 63 inside the second exterior portion 622 is moved upward and downward with respect to the base 61, and the support body main unit 51 is moved. Specifically, the vertical movement mechanism 65 includes a second air cylinder 651, which is disposed to extend in the vertical direction, as the driving mechanism.

The second air cylinder 651 moves the second exterior portion 622 upward and downward in the vertical direction. The second air cylinder 651 includes a second air cylinder main body 651*a*, and a second rod 651*b* which can be extended and contracted in the vertical direction with respect to the second air cylinder main body 651*a*. In the second air cylinder 651, the lower end portion in the vertical direction of the second air cylinder main body 651*a* is attached to the first exterior portion 621, and the upper end portion in the vertical direction of the second rod 651*b* is attached to the second exterior portion 622. For example, similar to the first air cylinder 641, as the second air cylinder 651, a hydraulic pressure cylinder or the like is used, and the second exterior portion 622 can be moved straight in the vertical direction with respect to the first exterior portion 621 by the extension and contraction of the second rod 651*b*. Here, specifications of the second air cylinder 651 are determined so that, in a state where the second rod 651*b* is accommodated in the second air cylinder main body 651*a* in the shortest length thereof, the position in the vertical direction of the support body main unit 51 is set to the support body insertion position P1, and in a state where the second rod 651*b* protrudes from the second air cylinder main body 651*a* in the longest length thereof, the position in the vertical direction of the support body main unit 51 is set to the tire extraction position P2.

When the support body 5 is moved from the PCI tire holding position P3 to the tire discharging position P4, the transport mechanism 66 inclines the support body main unit 51 and transports the vulcanized tire W to the carrying-out destination 8. The transport mechanism 66 includes a rotation mechanism 661 which rotates the pair of support bodies 5 so that the side of the transport mechanism 66 opposite to the carrying-out destination 8 faces upward, and a transport plate 664 which transports the vulcanized tire W from the support body main unit 51 rotated by the rotation mechanism 661 to the transport destination.

Figure 4A:
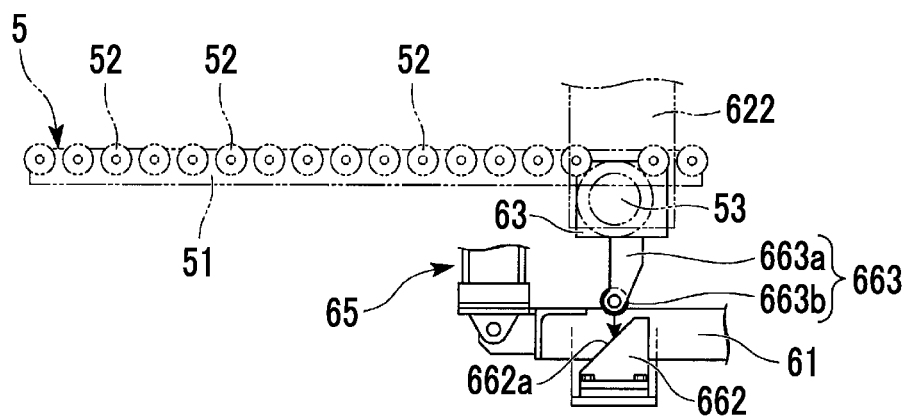
FIG. 4A is an enlarged view showing a state before a rotation mechanism in the embodiment of the present invention rotates a support body.
Figure 4B:
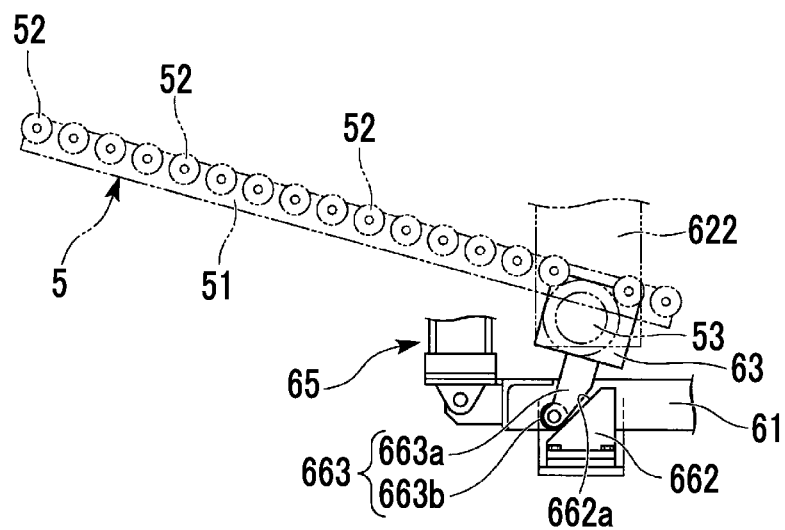
FIG. 4B is an enlarged view showing a state after the rotation mechanism in the embodiment of the present invention rotates the support body.

When the support body 5 is moved from the PCI tire holding position P3 to the tire discharging position P4 by the vertical movement mechanism 65, the rotation mechanism 661 rotates the moving body main unit 63, to which the support body rotating shaft 53 is connected, in a direction in which the front end portion in the horizontal direction of the support body main unit 51 positioned at the side opposite to the carrying-out destination 8 faces upward. As shown in FIGS. 4A and 4B, the rotation mechanism 661 of the present embodiment includes a base portion 662 which is fixed to the base 61 and includes an inclined surface 662*a*, and a contacted body 663 which comes into contact with the inclined surface 662*a* when the support body 5 moves to the tire discharging position P4.

The base portion 662 is fixed to the upper portion of the base 61. The base portion 662 is disposed at a position at which the base portion 662 intersects with the moving body main unit 63 which is lowered toward the tire discharging position P4 from the PCI tire holding position P3. The section of the base portion 662 of the present embodiment orthogonal to the width direction is formed in a trapezoidal shape. In the base portion 662, the inclined surface 662*a* inclined at 45° is formed so as to be directed to the front side in the horizontal direction and the upper side in the vertical direction.

The contacted body 663 is integrally attached to the lower portion of the moving body main unit 63. When the support body 5 is moved from the PCI tire holding position P3 to the tire discharging position P4 by the vertical movement mechanism 65, the contacted body 663 comes into contact with and is pressed by the inclined surface 662*a* of the base portion 662, and thus, the moving body main unit 63 is rotated. Specifically, the contacted body 663 includes a contacted body main unit 663*a* which is integrally fixed to the lower portion of the moving body main unit 63, and a rotation roller 663*b* which is rotatably attached to the contacted body main unit 663*a*.

The contacted body main unit 663*a* is formed so as to extend in a flat plate shape in the vertical direction, and the upper end portion of the contacted body main unit 663*a* in the vertical direction is fixed to the lower portion of the moving body main unit 63. When the contacted body main unit 663*a* is rotated, the contacted body main unit 663*a* is formed in a shape in which the edge of the inclined surface 662*a* side is cut off so that the contacted body main unit 663*a* does not come into contact with the inclined surface 662*a* of the base portion 662.

The rotation roller 663*b* is rotatably attached to the lower end portion in the vertical direction of the contacted body main unit 663*a* around a shaft extending in the width direction.

The transport plate 664 is fixed to the base 61 at the rear side in the horizontal direction from the base portion 662 of the rotation mechanism 661. The transport plate 664 is disposed on an extension line of the support body main unit 51 which is inclined by the rotation mechanism 661. The transport plate 664 of the present embodiment is a plate-shaped member which is disposed so as to be inclined at the same angle as that of the inclined support body main unit 51. The transport plate 664 receives the vulcanized tire W sliding on the inclined support body main unit 51, and transports the vulcanized tire W to the carrying-out destination 8.

The plane position adjusting portion 7 positions the plane position of the vulcanized tire W on the support body main unit 51 which is disposed at the PCI tire holding position P3. Specifically, the plane position adjusting portion 7 of the present embodiment is positioned so that the plane position of the center axis of the vulcanized tire W horizontally supported on the support body main unit 51 at the PCI tire holding position P3 overlaps with the plane position of the center axis of the lower rim 321 lifted by the lower rim lifting device 322. The plane position adjusting portion 7 includes a positioning member 71 which is disposed on the outside in the width direction from the support body main unit 51 disposed at the PCI tire holding position P3.

The positioning members 71 are disposed at four locations on the outside in the width direction from the support body main unit 51 disposed at the PCI tire holding position P3. The positioning members 71 are formed in rod shapes, and are disposed so as to be circumferentially separated from each other with the center axis of the lower rim 321 at the plane position as the center. Each of the position members 71 is disposed in a state of being extended in the horizontal direction. The support body 5 is moved to the PCI tire holding position P3, the positioning members 71 stand up from the state of being extended in the horizontal direction to the state of being extended in the vertical direction with respect to the vulcanized tire W on the support body main unit 51 toward the center axis of the lower rim 321. As a result, the plane positions of the positioning members 71 are determined so that the vulcanized tire W is interposed between the positioning members and does not move in the horizontal direction or the width direction.

Next, an operation of the tire vulcanizing system 1 of the above-described present embodiment will be described.

Figure 5:
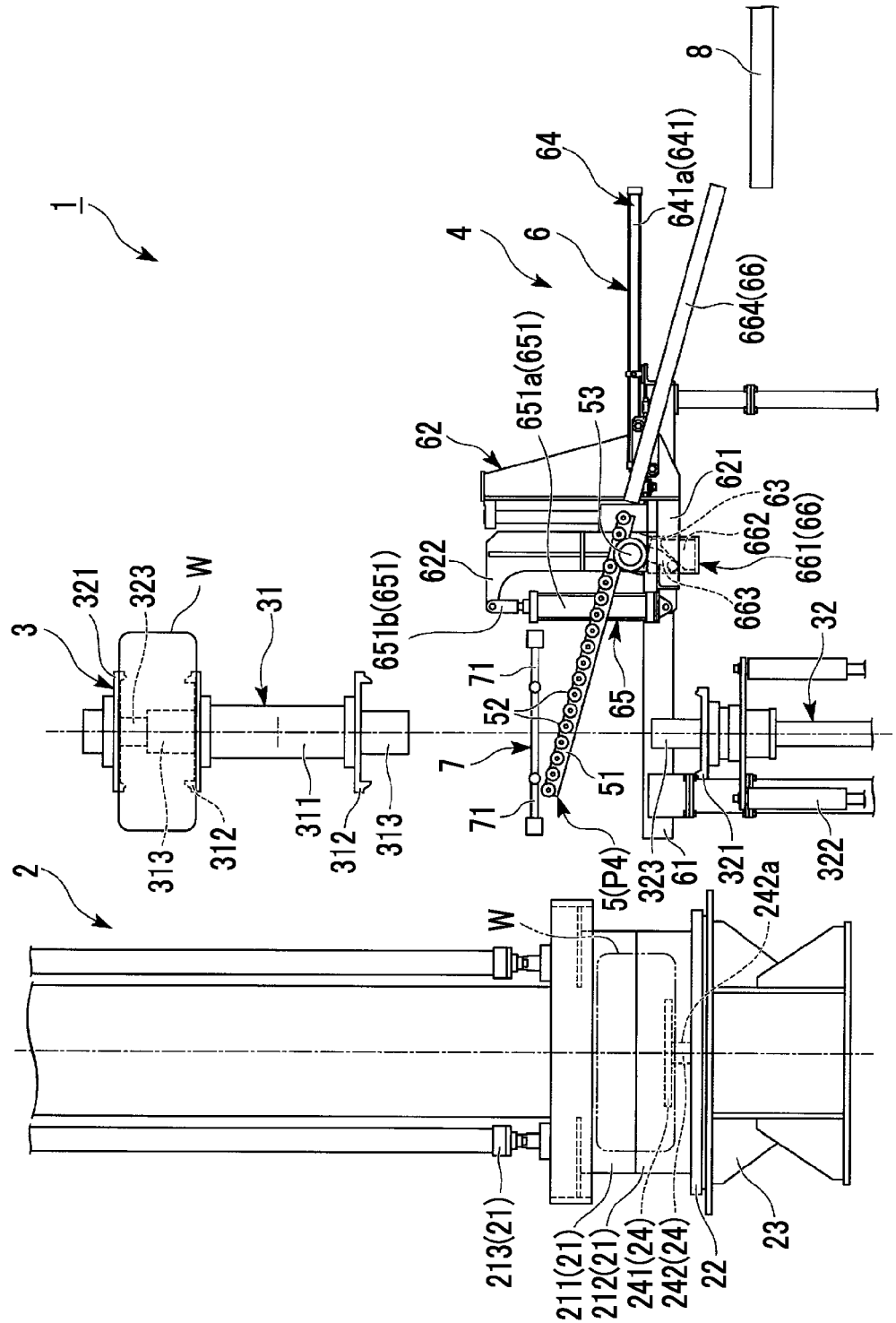
FIG. 5 is a side view showing a state where vulcanization is performed by a tire vulcanizer in the tire vulcanizing system of the embodiment of the present invention.

As shown in FIG. 5, in the tire vulcanizing system 1 of the above-described embodiment, the upper mold 211 of the tire vulcanizer 2 is lowered by the upper mold lifting device 213 to join the lower mold 212, and thus, the mold 21 is closed in the state where the green tire is accommodated in the inner portion of the mold 21. A bladder (not shown) is inflated inside the green tire in the mold 21, and thus, the green tire is pressed to the mold 21 from the inner side. In this state, the lower platen 22 is heated, and vulcanization is performed on the green tire inside the mold 21. In this case, in the unloading device 4, the support body 5 is disposed at the tire discharging position P4.

Figure 6:
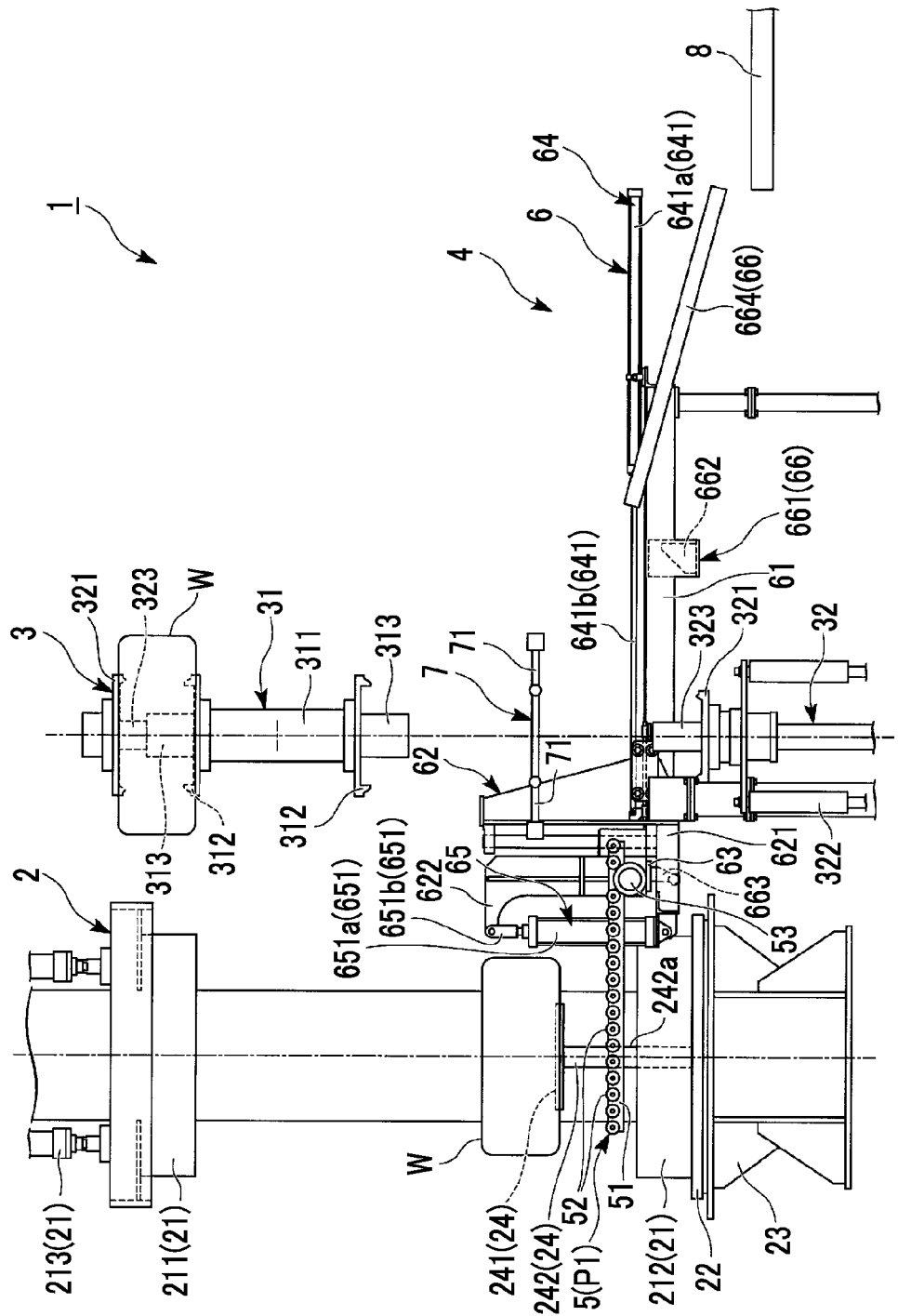
FIG. 6 is a side view showing the support body which moves to a support body insertion position in the tire vulcanizing system of the embodiment of the present invention.

When the vulcanization ends, as shown in FIG. 6, the upper mold 211 is lifted by the upper mold lifting device 213, the mold 21 is open, and thus, the upper mold 211 is separated from the lower mold 212. In addition, since the bead lift portion main body 242 extends upward in the vertical direction, the vulcanized tire W held by the bead ring 241 also moves upward, and thus, the vulcanized tire W is separated from the lower mold 212. When the vulcanized tire W is lifted to the position, at which the tire is separated from the lower mold 212, by the bead lift portion main body 242, the first exterior portion 621 is pressed by the first air cylinder 641 of the horizontal movement mechanism 64 and moves forward in the horizontal direction. Since the first exterior portion 621 is moved, the support body rotating shaft 53 connected to the moving body main unit 63 in the second exterior portion 622 is also moved forward in the horizontal direction. Accordingly, the support body 5 moves from the tire discharging position P4 to the support body insertion position P1.

Figure 7:
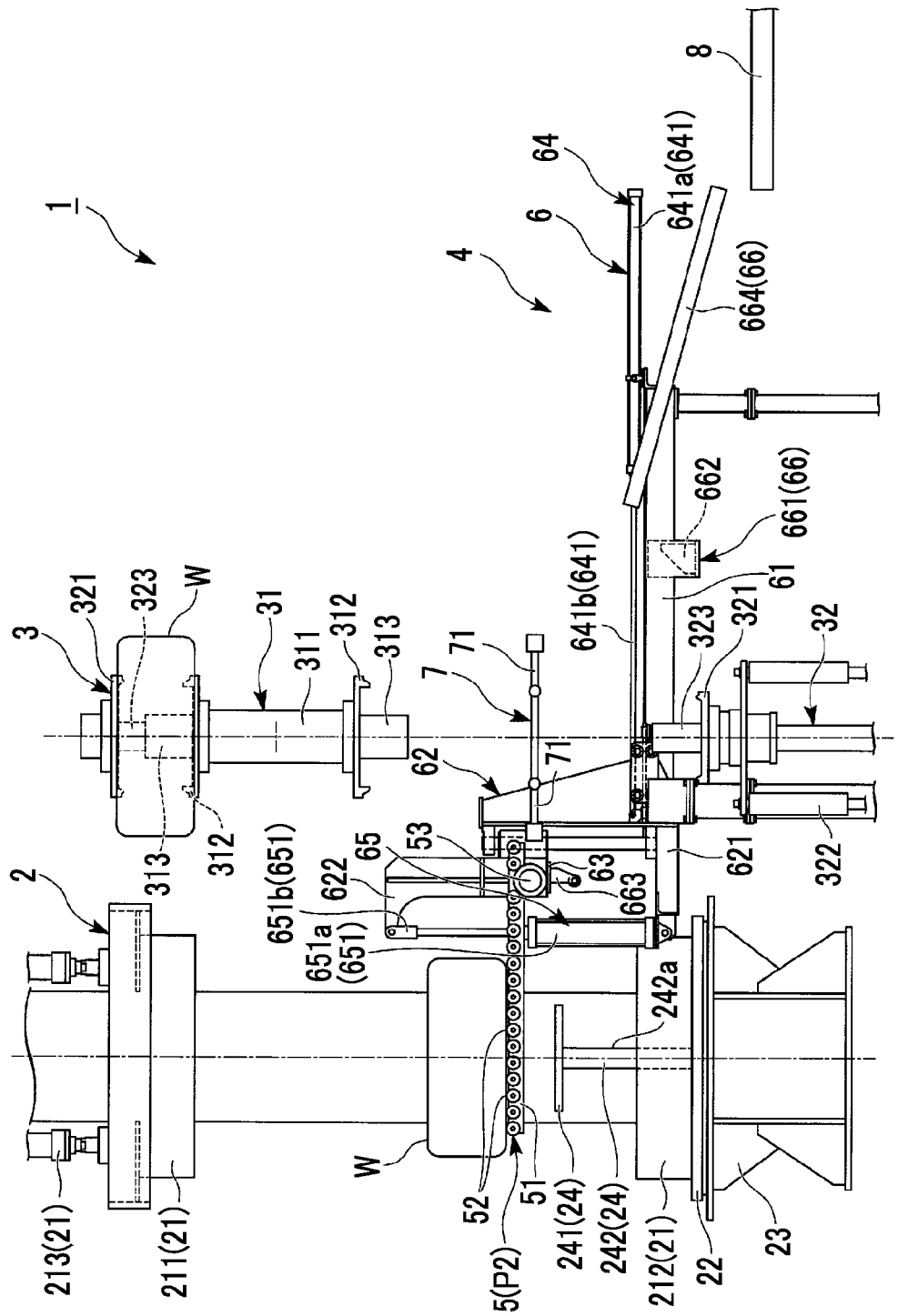
FIG. 7 is a side view showing the support body which moves to a tire extraction position in the tire vulcanizing system of the embodiment of the present invention.

If the support body 5 moves to the support body insertion position P1, as shown in FIG. 7, the vertical movement mechanism 65 moves the support body main unit 51 from the support body insertion position P1 to the tire extraction position P2. As a result, the rollers 52 which are supported by the support body main unit 51 move upward in the vertical direction relative to the bead ring 241 supporting the vulcanized tire W, and receive the vulcanized tire W from the bead ring 241. Specifically, the second exterior portion 622 moves upward in the vertical direction with respect to the first exterior portion 621 via the second air cylinder 651 of the vertical movement mechanism 65. Since the second exterior portion 622 moves, the support body rotating shaft 53 connected to the moving body main unit 63 in the second exterior portion 622 also moves upward in the vertical direction. Accordingly, the support body 5 moves from the support body insertion position P1 to the tire extraction position P2. When the support body 5 moves from the support body insertion position P1 to the tire extraction position P2, the support body 5 comes into contact with and supports the lower portion of the vulcanized tire W which is held by the bead ring 241, and moves upward along the vulcanized tire W. Meanwhile, the bead ring 241 or the bead lift portion main body 242 passes through the portion between the support body main units 51 which are disposed so as to be separated from each other in the width direction, and moves downward in the vertical direction without coming into contact with the support body main units 51 and the rollers 52. Accordingly, the vulcanized tire W is separated from the bead ring 241, moves to the tire extraction position P2 along with the support body main units 51, and is detached from the tire vulcanizer 2.

Figure 8:
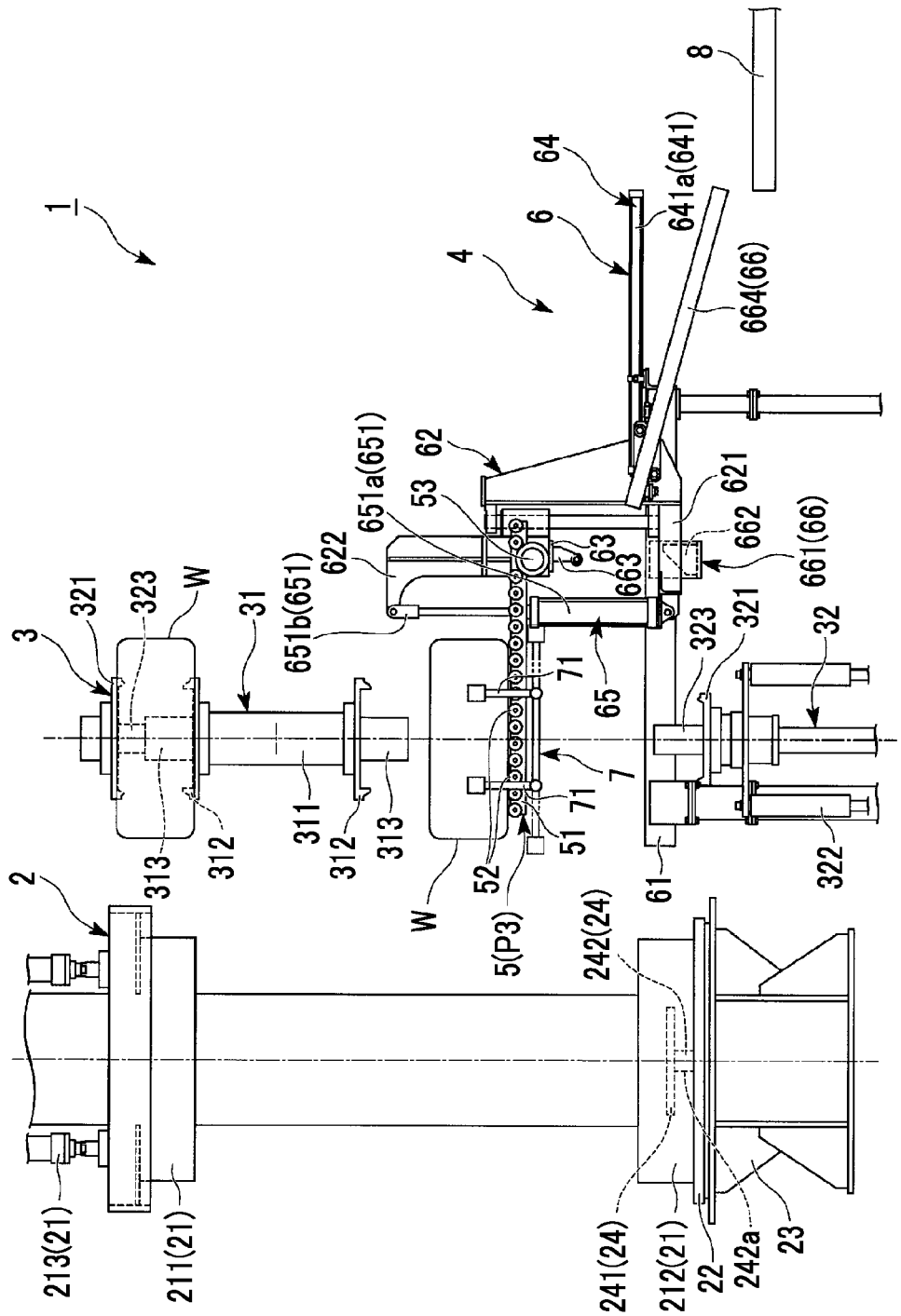
FIG. 8 is a side view showing the support body which moves to a PCI tire holding position in the tire vulcanizing system of the embodiment of the present invention.

If the support body 5 moves to the tire extraction position P2, as shown in FIG. 8, the first exterior portion 621 is pulled by the first air cylinder 641 of the horizontal movement mechanism 64 and is moved rearward in the horizontal direction. Since the first exterior portion 621 is moved, the support body rotating shaft 53 connected to the moving body main unit 63 in the second exterior portion 622 is also moved rearward in the horizontal direction. Accordingly, the support body 5 moves from the tire extraction position P2 to the PCI tire holding position P3. In addition, the plane position of the vulcanized tire W on the support body main unit 51 which is moved to the PCI tire holding position P3 is adjusted by the plane position adjusting portion 7. Specifically, the positioning members 71 which are disposed on the outside in the width direction of the support body main body 51 stand up toward the vulcanized tire W. Accordingly, the vulcanized tire W is interposed between the positioning members 71, and the position of the vulcanized tire on the support body main unit 51 is adjusted and determined so that the plane position of the center axis of the vulcanized tire W overlaps with the plane position of the center axis of the lower rim 321 which is lifted.

Figure 9:
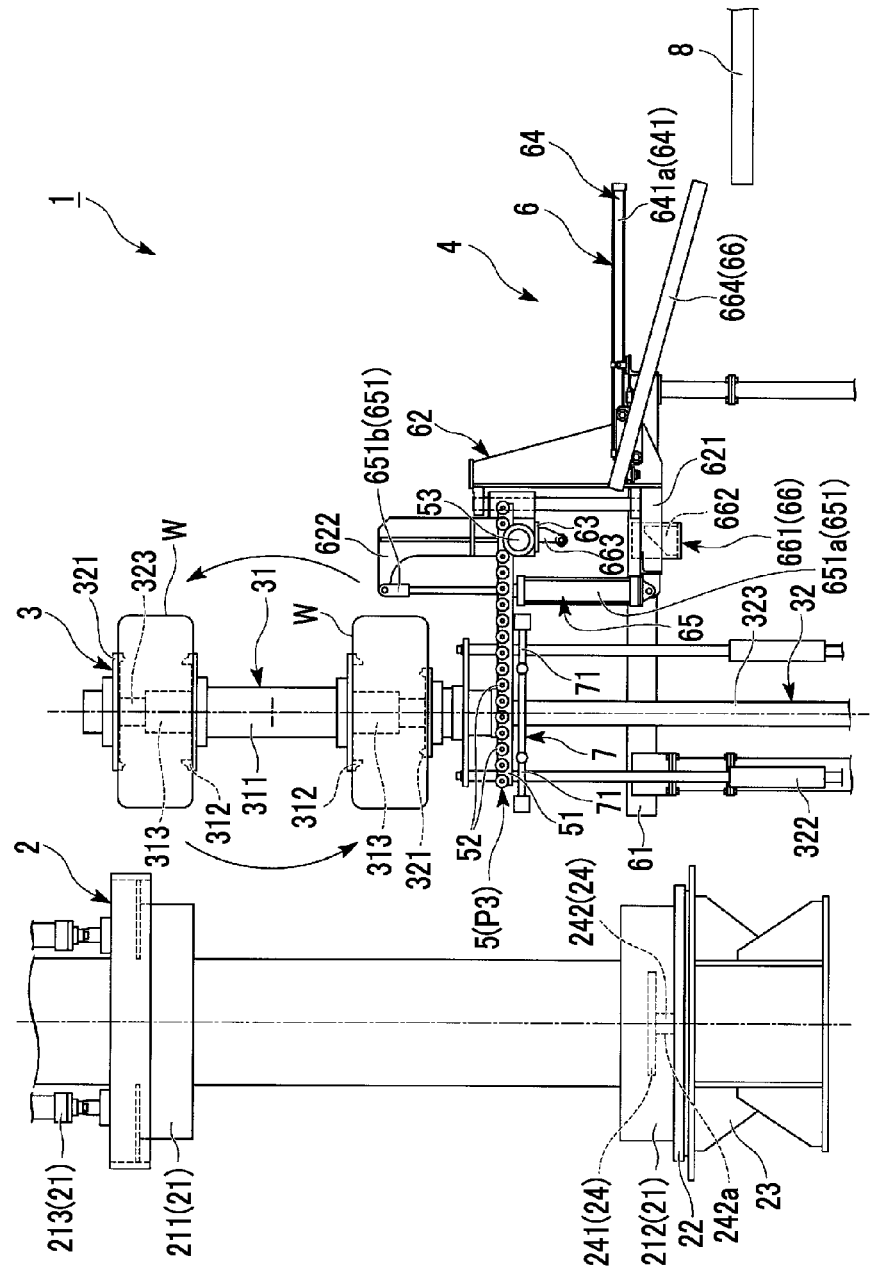
FIG. 9 is a side view showing a state where a vulcanized tire is delivered to the PCI device in the tire vulcanizing system of the embodiment of the present invention.

If the vulcanized tire W is positioned by the plane position adjusting portion 7, as shown in FIG. 9, the lower rim side connection device 323 is moved upward along with the lower rim 321 by the lower rim lifting device 322, and is inserted into the hole inside the vulcanized tire W. Moreover, the upper rim side connection device 313 and the lower rim side connection device 323 are connected to each other, and the vulcanized tire W is interposed between the upper rim 312 and the lower rim 321 and is held. The upper tire holding portion main body 311 is rotated and inverted vertically, and thus, the vulcanized tire W is cooled at the upper portion of the upper tire holding portion main body 311.

Here, since the time required for the cooling is longer than the time required for the vulcanization, the vulcanized tires W are continuously cooled at the upper portion and the lower portion of the upper tire holding portion 31. That is, while the cooling is performed on one side of the upper tire holding portion 31, the vulcanized and cooled tire W is carried-out to the carrying-out destination 8 by the unloading device 4, and a new vulcanized tire W is transported from the tire vulcanizer 2, and it is possible to set the new vulcanized tire W to the lower tire holding portion 32.

Figure 10:
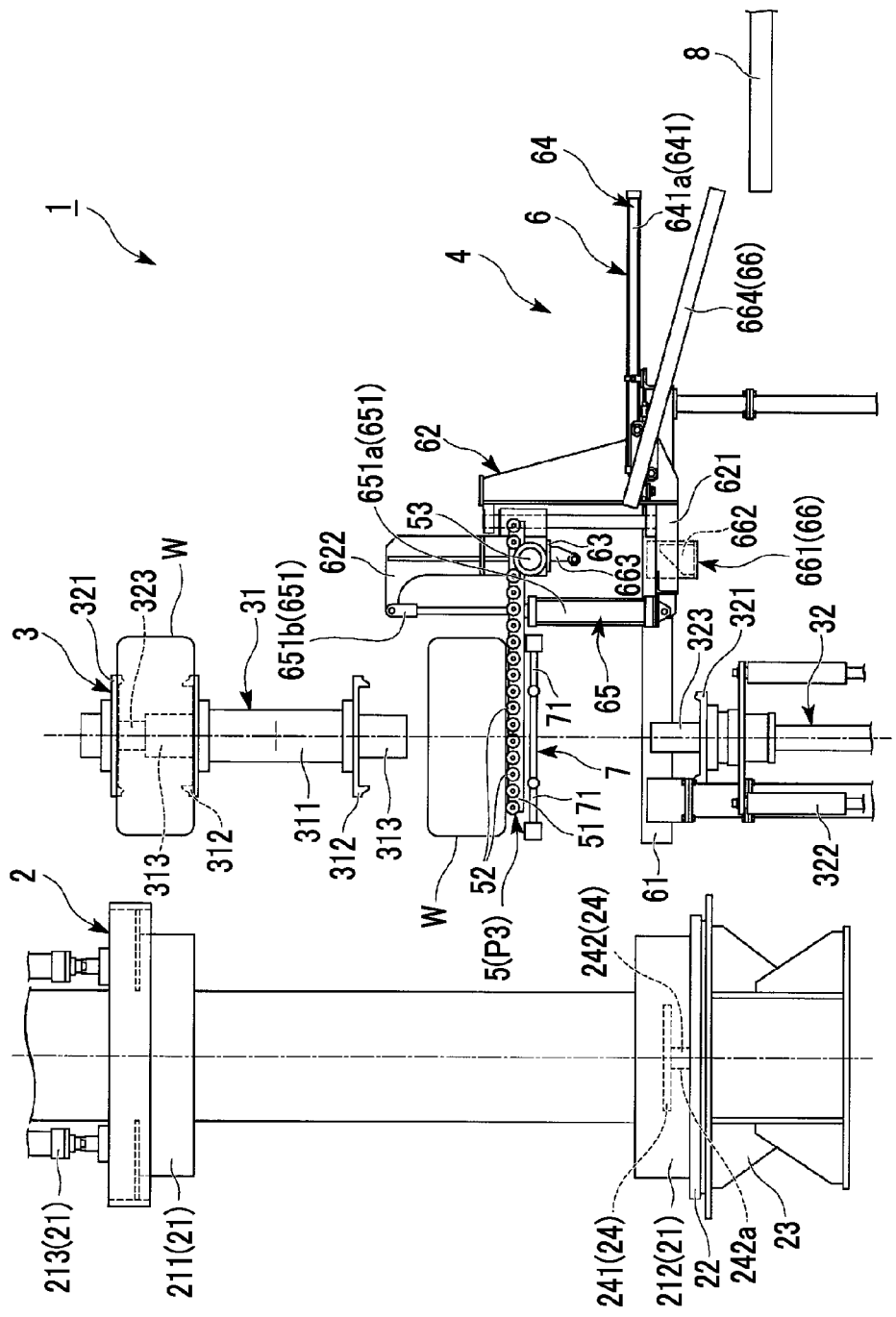
FIG. 10 is a side view showing a state where the vulcanized tire is received from the PCI device at the PCI tire holding position in the tire vulcanizing system of the embodiment of the present invention.

If the cooling with respect to the vulcanized tire W ends, as shown in FIG. 10, the connection between the upper rim side connection device 313 and the lower rim side connection device 323 is released, the lower rim 321 is moved downward in the vertical direction along with the vulcanized tire W by the lower rim lifting device 322 of the lower tire holding portion 32. When the lower rim 321 moves downward, the side surface of the vulcanized tire W comes into contact with the upper portions of the rollers 52 of the support body 5 disposed at the PCI tire holding position P3. Meanwhile, the lower rim 321 or the lower rim lifting device 322 passes through the support body main units 51 disposed so as to be separated from each other in the width direction, and is lowered without coming into contact with the support body main units 51 and the rollers 52. Accordingly, the vulcanized tire W is separated from the lower rim 321, remains on the support body main unit 51, and is detached from the PCI device 3.

Figure 11:
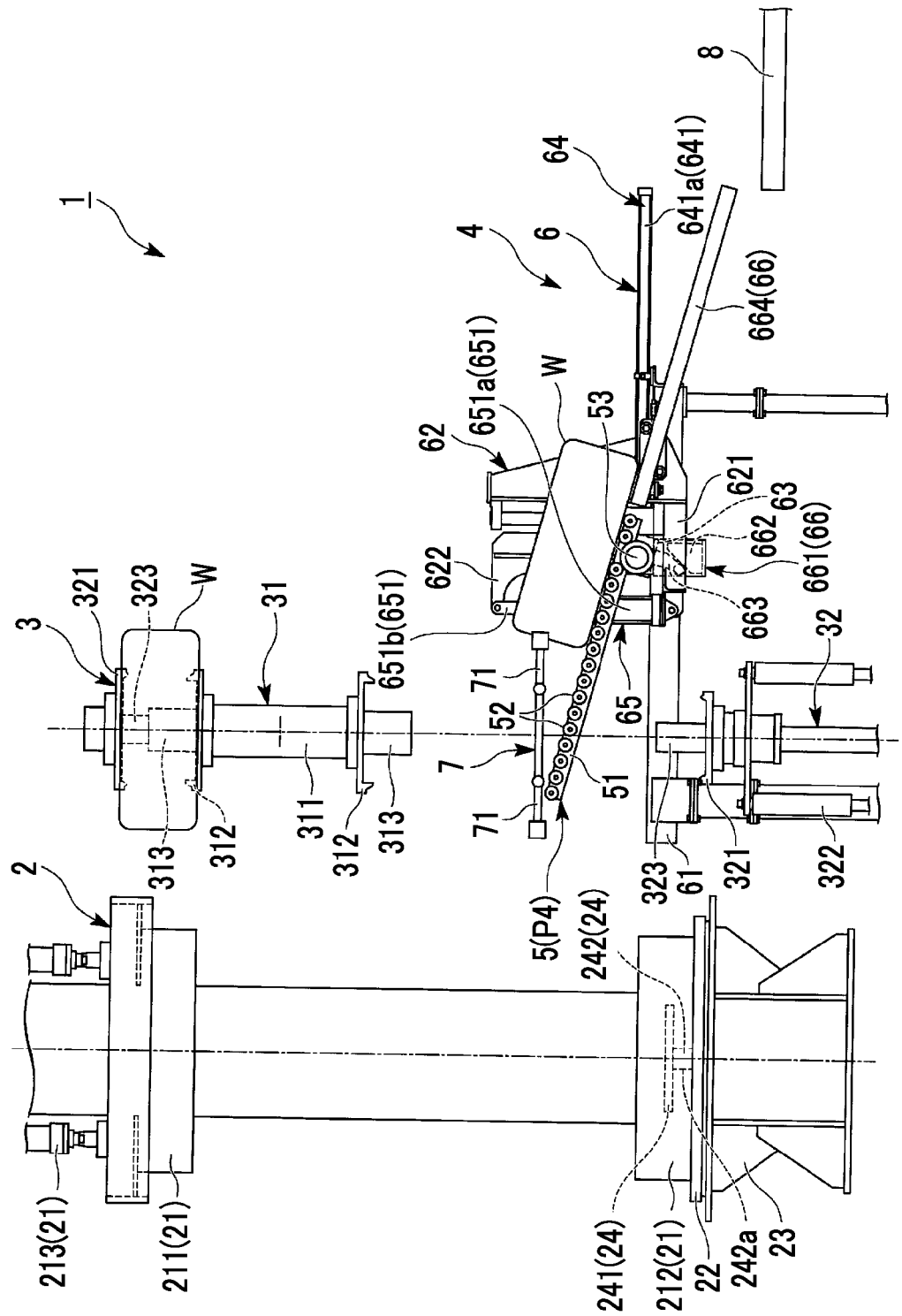
FIG. 11 is a side view showing the support body which moves to a tire discharging position in the tire vulcanizing system of the embodiment of the present invention.

When the vulcanized tire W is separated from the PCI device 3 at the PCI tire holding position P3, the second exterior portion 622 is moved downward in the vertical direction with respect to the first exterior portion 621 by the second air cylinder 651 of the vertical movement mechanism 65. Since the second exterior portion 622 moves, the support body rotating shaft 53 connected to the moving body main unit 63 in the second exterior portion 622 also moves downward in the vertical direction. Accordingly, the support body 5 moves toward the tire discharging position P4. As shown in FIGS. 4A and 4B, since the moving body main unit 63 is lowered toward the tire discharging position P4, the rotation roller 663*b* of the contacted body 663 fixed to the lower portion of the moving body main unit 63 comes into contact with the inclined surface 662*a* of the base portion 662. If the moving body main unit 63 is moved farther downward in the state where the rotation roller 663*b* comes into contact with the inclined surface 662*a*, the rotation roller 663*b* rolls and slides on the inclined surface 662*a*, and thus, the contacted body main unit 663*a* is inclined. Since the contacted body main unit 663*a* is inclined, the moving body main unit 63 to which the contacted body main unit 663*a* is attached is rotated. Accordingly, the support body rotating shaft 53 of the support body 5 also rotates, and as shown in FIG. 11, the support body main unit 51 connected to the support body rotating shaft 53 moves to the tire discharging position P4 while being inclined.

If the support body 5 moves to the tire discharging position P4, since the support body main unit 51 is inclined, the vulcanized tire W slides on the rollers 52, and the vulcanized tire W slides toward the transport plate 664 and is transported to the transport plate 664. In addition, the vulcanized tire W slides farther on the inclined transport plate 664, and thus, the vulcanized tire W is transported to a main conveyor which is the carrying-out destination 8.

According to the above-described unloading device 4, since the support body main unit 51 of the support body 5 which supports the vulcanized tire W from the lower portion in the vertical direction is moved from the tire extraction position P2 to the PCI tire holding position P3 by the first air cylinder 641 of the horizontal movement mechanism 64, it is possible to transport the vulcanized tire W vulcanized by the tire vulcanizer 2 to the PCI device 3. In addition, it is possible to transport the vulcanized tire W cooled by the PCI device 3 to the carrying-out destination 8 with the transport mechanism 66. That is, since the support body 5 is moved by the horizontal movement mechanism 64, it is possible to easily transport the vulcanized tire W from the tire vulcanizer 2 to the PCI device 3, and it is possible to easily move the vulcanized tire W from the PCI device 3 to the carrying-out destination 8 via the transport mechanism 66. Accordingly, by a simple configuration which includes the support body 5 which supports the vulcanized tire W from the lower portion in the vertical direction, the horizontal movement mechanism 64 such as the first air cylinder 641 which moves the support body 5 in the horizontal direction, and the transport mechanism 66, it is possible to transport the vulcanized tire W from the tire vulcanizer 2. Therefore, without using complicated configurations such as a mechanism for holding the vulcanized tire W or a mechanism for rotating the vulcanized tire W, it is possible to install the unloading device 4 with a small number of parts, and it is possible to decrease the installation cost.

In addition since the movement portion 6 includes the vertical movement mechanism 65 such as the second air cylinder 651 which moves the support body 5 upward and downward in the vertical direction, it is possible to easily detach the vulcanized tire W which is supported by the bead ring 241 of the tire vulcanizer 2. That is, by simply moving the support body 5 upward from the support body insertion position P1 toward the tire extraction position P2 with respect to the vulcanized tire W held by the bead ring 241, it is possible to easily detach the vulcanized tire W from the bead ring 241. Therefore, it is possible to provide a mechanism, which easily detaches the vulcanized tire W from the tire vulcanizer 2, with a simple configuration. Accordingly, it is possible to install the unloading device 4 with a smaller number of parts, and it is possible to further decrease an installation cost.

In addition, the transport mechanism 66 can incline the support body main unit 51 by the rotation mechanism 661 which rotates the support body rotating shaft 53 so that the front side in the horizontal direction of the support body 5 which is opposite to the carrying-out destination 8 is directed upward at the tire discharging position P4. Accordingly, it is possible to slide the vulcanized tire W on the rollers 52 which are attached to the support body main unit 51. Therefore, it is possible to provide a mechanism, which transports the vulcanized tire W at the tire discharging position P4 to the carrying-out destination 8, with a simple configuration. Accordingly, it is possible to install the unloading device 4 with a smaller number of parts, and it is possible to further decrease the installation cost.

In addition, since the rotation mechanism 661 rotates the support body rotating shaft 53 when the support body 5 is lowered from the PCI tire holding position P3 toward the tire discharging position P4 by the vertical movement mechanism 65, it is possible to effectively carry-out the vulcanized tire W, which is cooled by the PCI device 3, to the carrying-out destination 8. That is, it is possible to configure the mechanism which moves the vulcanized tire W cooled by the PCI device 3 to the carrying-out destination 8 using the vertical movement mechanism 65, and it is possible to make the unloading device 4 compact. Accordingly, it is possible to secure a space around the unloading device 4, and it is possible to secure a wider work space around the tire vulcanizer 2 or the PCI device 3.

Moreover, since the rotation roller 663*b* of the contacted body 663 supported by the inclined surface 662*a* of the base portion 662 fixed to the base 61 is moved along the inclined surface 662a by the lowering of the contacted body main unit 663a, it is possible to incline the contacted body main unit 663a and rotate the moving body main unit 63. Therefore, it is possible to rotate the support body rotating shaft 53 connected to the moving body main unit 63 and incline the support body main unit 51. Accordingly, it is possible to easily form the configuration which inclines the support body main unit 51.

Moreover, since the vulcanized tire W on the support body main unit 51 moved to the PCI tire holding position P3 is interposed between the positioning members 71 of the plane position adjusting portion 7, the position of the center axis of the vulcanized tire W is determined so that the plane position of the center axis of the vulcanized tire W overlaps with the plane position of the center axis of the lower rim 321 lifted by the lower rim lifting device 322. Accordingly, the support body 5 moves from the tire extraction position P2 to the PCI tire holding position P3, and thus, even when the position of the vulcanized tire W on the support body main unit 51 is deviated, it is possible to adjust the position of the vulcanized tire W to the position at which the vulcanized tire W can be delivered to the PCI device 3 with high accuracy and to move the vulcanized tire W. Accordingly, it is possible to stably transport the vulcanized tire W on the support body main unit 51 moved by the horizontal movement mechanism 64 to the PCI device 3.

Hereinbefore, the embodiment of the present invention is described in detail with reference to the drawings. However, configurations in the embodiment, the combination thereof, and the like are examples, and addition, omission, replacement, other modifications of the configurations may be performed within a scope which does not depart from the gist of the present invention. In addition, the present invention is not limited by the embodiment, and is limited only by claims.

In addition, the horizontal movement mechanism 64 or the vertical movement mechanism 65 is not limited by the first air cylinder 641 or the second air cylinder 651, and as with other sliding driving mechanisms, a mechanism such as a ball screw, a rack gear and pinion gear, or a chain and sprocket which combines with a motor may be used.

Moreover, the plane position adjusting portion 7 is not limited to the configuration of the present embodiment, and may adopt any configuration as long as it can position the plane position of the vulcanized tire W. For example, a configuration may be adopted, which adjusts the position of the vulcanized tire W on the support body main unit 51 by controlling the rotations of the rollers 52 of the support body 5.

Figure 12:
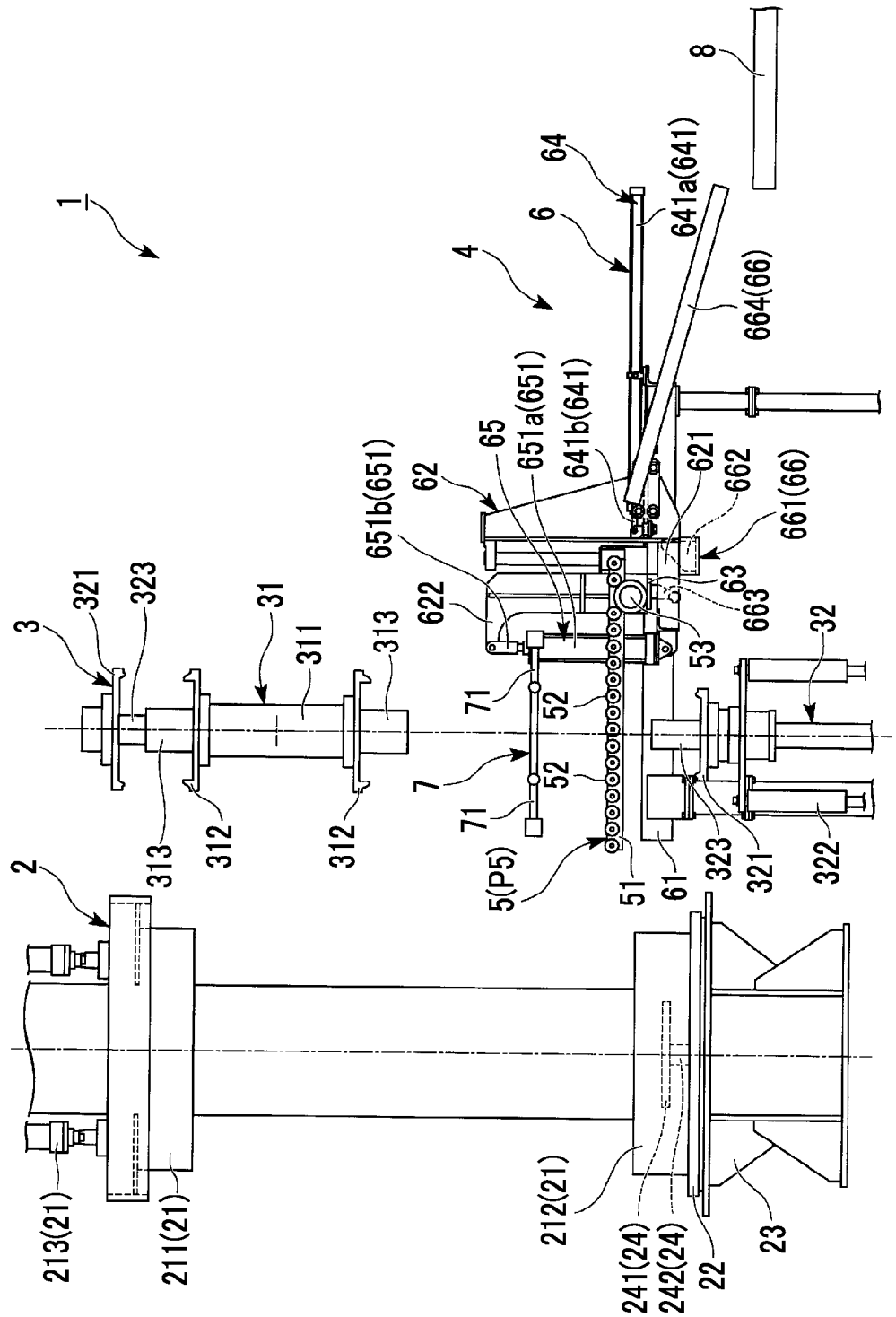
FIG. 12 is a side view showing the position of the support body of the tire vulcanizing system when a standby position is provided in a modification example of the embodiment of the present invention.

Moreover, the support body 5 is not limited to a support body which waits at the tire discharging position P4 when the support body 5 is not moved or the like. That is, as shown in FIG. 12, the support body 5 may include a standby position P5 at which the support body main unit 51 is disposed in the state of extending in the horizontal direction at a front side in the horizontal direction from the tire discharging position P4.

INDUSTRIAL APPLICABILITY

According to the unloading device, since it is possible to install the unloading device with a small number of parts, it is possible to decrease the installation cost.

REFERENCE SIGNS LIST

1: TIRE VULCANIZING SYSTEM
W: VULCANIZED TIRE
2: TIRE VULCANIZER
21: MOLD
211: UPPER MOLD
212: LOWER MOLD
213: UPPER MOLD LIFTING DEVICE
22: LOWER PLATEN
23: PEDESTAL
24: BEAD LIFT PORTION
241: BEAD RING
242: BEAD LIFT PORTION MAIN BODY
242a: INNER TUBE
3: PCI DEVICE
31: UPPER TIRE HOLDING PORTION
311: UPPER TIRE HOLDING PORTION MAIN BODY
312: UPPER RIM
313: UPPER RIM SIDE CONNECTION DEVICE
32: LOWER TIRE HOLDING PORTION
321: LOWER RIM
322: LOWER RIM LIFTING DEVICE
323: LOWER RIM SIDE CONNECTION DEVICE
4: UNLOADING DEVICE
5: SUPPORT BODY
51: SUPPORT BODY MAIN UNIT
52: ROLLER
53: SUPPORT BODY ROTATING SHAFT
P1: SUPPORT BODY INSERTION POSITION
P2: TIRE EXTRACTION POSITION
P3: PCI TIRE HOLDING POSITION
P4: TIRE DISCHARGING POSITION
6: MOVEMENT PORTION
61: BASE
62: EXTERIOR PORTION
621: FIRST EXTERIOR PORTION
622: SECOND EXTERIOR PORTION
63: MOVING BODY MAIN UNIT
64: HORIZONTAL MOVEMENT MECHANISM
641: FIRST AIR CYLINDER
641a: FIRST AIR CYLINDER MAIN BODY
641b: FIRST ROD
65: VERTICAL MOVEMENT MECHANISM
651: SECOND AIR CYLINDER
651a: SECOND AIR CYLINDER MAIN BODY
651b: SECOND ROD
66: TRANSPORT MECHANISM
661: ROTATION MECHANISM
662: BASE PORTION
662a: INCLINED SURFACE
663: CONTACTED BODY
663a: CONTACTED BODY MAIN UNIT
663b: ROTATION ROLLER
664: TRANSPORT PLATE
7: PLANE POSITION ADJUSTING PORTION
71: POSITIONING MEMBER
8: CARRYING-OUT DESTINATION

The invention claimed is:

1. An unloading device which transports a vulcanized tire vulcanized by a tire vulcanizer from the tire vulcanizer to a cooling PCI device, and transports the vulcanized tire cooled by the PCI device, comprising:
a pair of support bodies which is formed to extend in a horizontal direction and supports side surfaces of the vulcanized tire from a lower portion in a vertical direction; and
a movement portion which moves the support bodies, wherein the movement portion includes:

a horizontal movement mechanism which moves the support bodies in the horizontal direction from a tire extraction position at which the vulcanized tire supported by a bead ring of the tire vulcanizer can be extracted to a PCI tire holding position at which the vulcanized tire can be held by a tire holding portion of the PCI device; and a transport mechanism which transports the vulcanized tire, which is cooled by the PCI device and is received by the pair of support bodies at the PCI tire holding position, to a carrying-out destination, the support body includes a plurality of rollers, and the transport mechanism includes a rotation mechanism which rotates the pair of support bodies so that a side of the transport mechanism opposite to the carrying-out destination is directed upward.

2. The unloading device according to claim 1, wherein the movement portion includes a vertical movement mechanism which moves the support bodies upward and downward in the vertical direction, and wherein the vertical movement mechanism moves the support bodies upward in the vertical direction with respect to the bead ring supporting the vulcanized tire, and receives the vulcanized tire from the bead ring.

3. The unloading device according to claim 2, wherein the rotation mechanism rotates the pair of support bodies when the pair of support bodies is moved from the PCI tire holding position by the vertical movement mechanism.

4. The unloading device according to claim 1, wherein the rotation mechanism includes a base portion which includes an inclined surface and a contacted body which can come into contact with the inclined surface, and wherein the contacted body comes into contact with and is pressed by the inclined surface to rotate the pair of support bodies.

5. The unloading device according to claim 1, further comprising:

a plane position adjusting portion which positions a plane position of the vulcanized tire on the pair of the support bodies at the PCI tire holding position.

* * * * *